No. 787,391. PATENTED APR. 18, 1905.
N. F. NIEDERLANDER.
BALL AND SOCKET PIPE JOINT.
APPLICATION FILED JUNE 18, 1902.
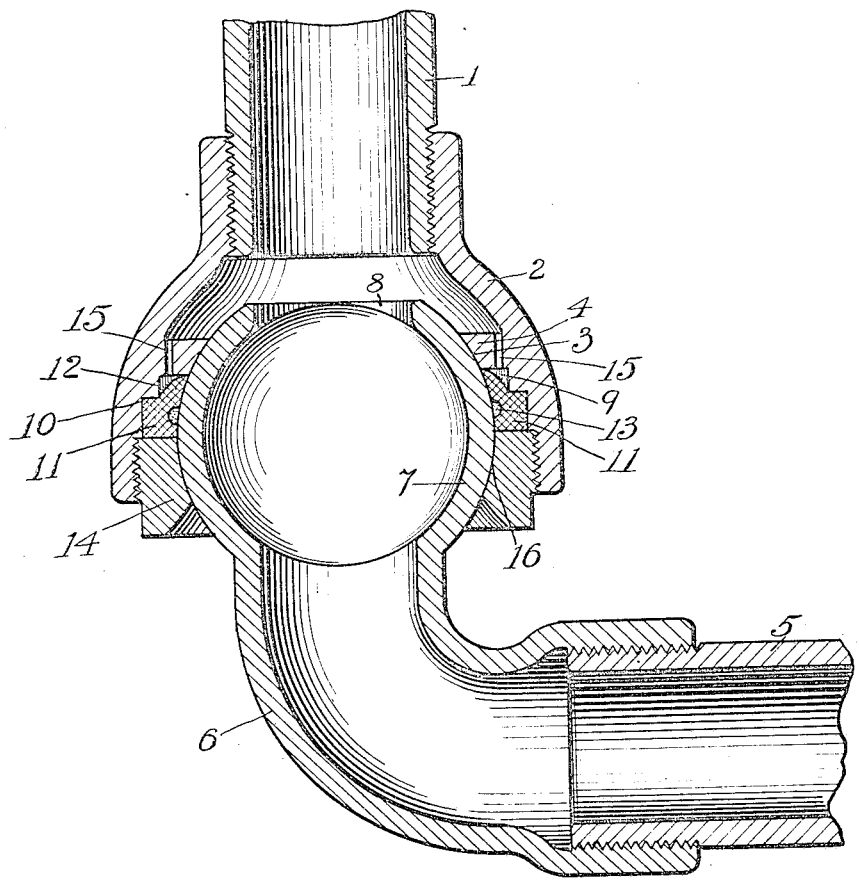

No. 787,391. Patented April 18, 1905.

UNITED STATES PATENT OFFICE.

NICHOLAS F. NIEDERLANDER, OF ST. LOUIS, MISSOURI, ASSIGNOR TO WESTINGHOUSE AUTOMATIC AIR & STEAM COUPLER COMPANY, A CORPORATION OF ILLINOIS.

BALL-AND-SOCKET PIPE-JOINT.

SPECIFICATION forming part of Letters Patent No. 787,391, dated April 18, 1905.

Application filed June 18, 1902. Serial No. 112,229.

*To all whom it may concern:*

Be it known that I, NICHOLAS F. NIEDERLANDER, a citizen of the United States, residing in St. Louis, State of Missouri, have invented a certain new and useful Improvement in Ball-and-Socket Pipe-Joints, of which improvement the following is a specification.

My invention relates to flexible joints for pipes, and has for its object to provide a joint of the ball-and-socket type adapted to be applied to pipes for transmitting air, steam, or other fluid under pressure, and especially applicable to pipe connections and couplings between railway-cars.

My invention consists in an improved form of ball-and-socket joint having great freedom of action and at the same time maintaining a perfectly fluid-tight joint, all as hereinafter more fully described, and set forth in the claim.

Referring to the accompanying drawing, which shows a central section of my improved construction, the pipe-section 1 is provided with a socket-piece 2, having an internal concave bearing-surface 3. As shown in the drawing, this bearing-surface is carried on the inwardly-extending annular flange 4. The other pipe-section, 5, is secured to the ball-piece 6, which terminates in the spherical-shaped head 7, having opening 8 and extending into the socket-piece 2 and bearing against the concave surface 3.

An annular recess 9, having a shoulder 10, is formed in the socket-piece for the reception of the packing-ring or gasket 11, which fills the space between the shoulder 10 and gland 14 and has a tapered portion 12 extending into the inner part of the recess 9. The gland 14 is provided with a concave bearing-surface 16 and when screwed into its position in the socket-piece 3 securely clamps the gasket against the shoulder 10. Perforations or ducts 15 are located in the flange 4 for the purpose of admitting the fluid-pressure into the space 9 back of the portion 12 of the gasket, thus holding the same tightly against the outer spherical surface of the ball 7 and maintaining a perfectly tight joint.

An annular groove 13 is formed in the face of the gasket and is filled with plumbago for the purpose of lubricating the joint and also to increase the efficiency of the packing.

By means of this construction a very serviceable joint is secured and one which is free from leakage, while at the same time very flexible and easily manipulated. The plumbago acts not only as a lubricant for the joint, but also fills all crevices and makes a perfectly smooth bearing between the gasket and the outer spherical surface of the ball, which is an important feature and renders the packing very efficient.

Having now described my invention, what I claim as new, and desire to secure by Letters Patent, is—

In a flexible pipe-joint, the combination of a socket-piece having an inner concave bearing-surface and an annular recess provided with a shoulder, a spherical head engaging said bearing, a gland having a concave bearing-surface engaging said spherical head, a gasket clamped between the said shoulder and the gland and having a tapered portion extending into the inner part of the recess, said gasket having a groove containing plumbago, and a passage for admitting fluid-pressure behind said extended portion of the gasket.

In testimony whereof I have hereunto set my hand.

NICHOLAS F. NIEDERLANDER.

Witnesses:
L. W. HAYNES,
A. J. SENGOTTA.